US006782275B2

(12) United States Patent
Mountain et al.

(10) Patent No.: US 6,782,275 B2
(45) Date of Patent: Aug. 24, 2004

(54) BROADCAST DATA RECEIVER AND METHOD OF USE THEREOF

(75) Inventors: Dale Mountain, Bradford (GB); Ivan Priest, London (GB)

(73) Assignee: Pace Micro Technology PLC, Shipley (GB)

( * ) Notice: Subject to any disclaimer, the term of this patent is extended or adjusted under 35 U.S.C. 154(b) by 533 days.

(21) Appl. No.: 09/956,564

(22) Filed: Sep. 19, 2001

(65) Prior Publication Data

US 2002/0039911 A1 Apr. 4, 2002

(30) Foreign Application Priority Data

Sep. 30, 2000 (GB) ............................................. 0023994

(51) Int. Cl.[7] .................................................. H04B 1/38

(52) U.S. Cl. .................. 455/558; 379/433.09; 455/347; 455/349

(58) Field of Search ................................ 455/558, 564, 455/347, 348, 349, 425, 550, 572, 575, 90.01; 379/433.01, 433.09

(56) References Cited

U.S. PATENT DOCUMENTS 6,484,039 B1 * 11/2002 Volland et al. ............. 455/558

FOREIGN PATENT DOCUMENTS

JP 410174009 A * 6/1998 ............ H04N/5/44

* cited by examiner

*Primary Examiner*—Melur Ramakrishnaiah
(74) *Attorney, Agent, or Firm*—Head, Johnson & Kachigian

(57) ABSTRACT

A broadcast data receiver (BDR) (10) and method of use of the same is provided. The BDR (10) receives data from a broadcaster at a remote location and processes and decodes the data to provide video, audio and/or auxiliary data. The BDR (10) is provided with a reception port/slot (8) for a SIM card (2) from a mobile phone. A smart card reader reads and processes the data stored on said SIM card memory, thereby allowing the SIM card data to be stored, viewed and/or utilized via the BDR (10) and/or display screen (14) connected or integrally formed with the BDR (10).

15 Claims, 1 Drawing Sheet

BROADCAST DATA RECEIVER AND METHOD OF USE THEREOF

CROSS-REFERENCE TO RELATED APPLICATION

Figure 1:
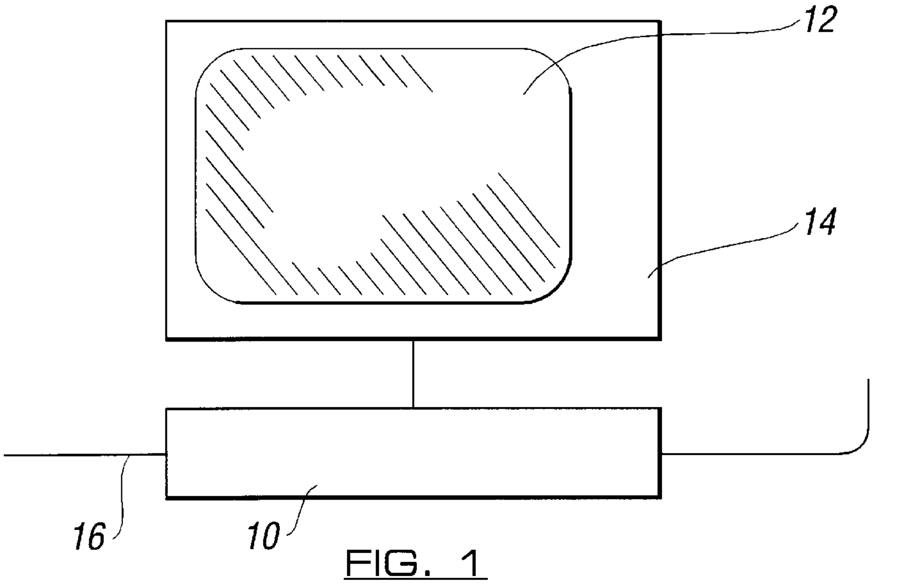

This application claims priority to British Patent Application 0023994.7 filed Sep. 30, 2000.

BACKGROUND OF THE INVENTION

The invention to which this application relates is an improvement to electrical apparatus and in particular, although not necessarily exclusively, to a broadcast data receiver.

Broadcast data receivers can be provided as an item of apparatus which can be connected to display apparatus such as a television set or, alternatively can be provided as an integral component of the television set.

In either case the receiver is provided to allow the reception of data which is broadcast from a broadcaster at a remote location and said data is increasingly transmitted in a digital format in which multiple streams of data representing video, audio and/or auxiliary data are transmitted from the service provider to a number of recipients. The data can be transmitted via known satellite, cable or terrestrial transmission systems. When received, the data is decoded and processed to combine the same into a format to generate known television signals via the television set. In many cases the receiver is equipped with a means to allow conditional access to services, which access is normally achieved by the insertion of a card carrying data thereon, known as a SMART card. The Smart card can be read and processed by a "reader" device provided in the receiver. These cards are typically of a credit card size.

It is also known for broadcast data receivers to support further features such as the storage of data. As the receiver is typically provided with a telecommunications link which allows the transmission of data to and from the receiver, e-mail services, home shopping or internet services can also be provided. The aim of the present invention is to provide a further useful feature to the broadcast data receiver which allows the same to become an increasingly useful item of electrical apparatus.

If one now turns to a mobile telephone handset, these are becoming increasingly popular and furthermore can now be used to generate e-mail and have access to the Internet. The mobile phone includes at the core of its operating system a SIM card on which operating data and user specific data can be stored. This data is stored on the card which is inserted in the phone and so the card can only be used with that phone and there is no easy way in which to transfer the information therefrom.

According to a first aspect of the present invention provides, there is provided a broadcast data receiver (BDR), said BDR receiving data from a broadcaster at a remote location and processing and decoding said data to provide video, audio and/or auxiliary data, and characterised in that said BDR is provided with means for the reception of a SIM card from a mobile phone and means for reading and processing data provided on said SIM card, thereby allowing said SIM card data to be stored, viewed and/or utilised via said BDR.

In one embodiment the SIM card is required to be placed in a holder which is of a dimension to fit in an insertion slot in the broadcast data receiver so as to allow the data on the SIM card to be at the correct location for the reading device. This also allows the reading device which is used to be the same as that used for reading the credit card sized SMART card which the receivers are conventionally required to be able to accept.

In one embodiment the receiver is provided to enable information from the SIM card to be generated on the screen of the television set connected thereto so that, for example, the memory of the SIM card which includes the mobile phone users phone book of names and numbers, can be accessed and the phone book details generated on screen for users to select.

Data stored on the SIM card can also be updated via the broadcast data receiver such as by typing the data into the phone book via a keyboard or other device connected to the receiver and/or copying data from other applications in the broadcast data receivers, such as by copying from an e-mail application. In this embodiment the reader device will also have a write facility.

In a further embodiment the data from the SIM card can be used to generate a number and name memory in the broadcast data receiver which allows the same to be used to make calls via the telecommunication line.

In a further embodiment the data from the SIM card can be copied to memory in the broadcast data receiver such that if the mobile phone is lost, damaged or stolen, the data can still be accessed via the memory in the broadcast data receiver and, if required, transferred to a new SIM card of a new phone which the user may find.

According to a second aspect of the present invention there is provided a method of using a broadcast data receiver, said BDR receiving data from a broadcaster at a remote location and processing and decoding said data to provide video, audio and/or auxiliary data and characterised in that said method includes the steps of inserting a SIM card from a mobile phone either directly or indirectly into reception means of a BDR, part or all of data stored in memory means on said SIM card being read and/or processed by reader means in said BDR, thereby allowing said SIM card data to be stored, viewed and/or utilised via said BDR.

Figure 2:
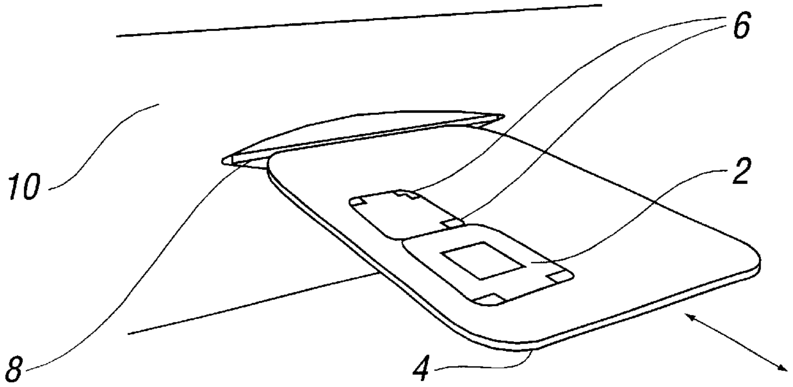

A specific embodiment of the invention is now described with reference to the accompanying drawings, wherein:

FIG. 1 illustrates a broadcast data receiver for use in accordance with one embodiment of the invention; and FIG. 2 illustrates one embodiment by which the SIM card can be inserted correctly into the broadcast data receiver for reading and/or processing.

In use therefore if a user of a mobile phone wishes to utilise the BDR facility in accordance with the invention, they can remove the SIM card 2 from the mobile phone and then insert the same into the card holder 4 as shown. The holder is typically provided of a size similar to a credit card, which allows the holder to be inserted in to the slot 8 provided in the broadcast data receiver 10, as shown in FIG. 2.

The holder is typically provided with a number of location positions 6 so as to allow the holder to be used with SIM cards and/or other cards of differing dimensions and to allow the means in/on which data is held on the card to be correctly positioned so as to allow the same to be read by a smart card reader provided in the BDR.

When the holder and card are inserted into the slot 8 of the BDR, the same can be used to provide a number of selectable features for the user as follows.

In a first use the user can use the reader to read data from memory of the SIM card and store the same in a memory in the receiver, such as the EPROM memory. In a further feature the data on the card can be updated via the broadcast data receiver, for example by the user typing text representative of new names and telephone numbers to be stored. This can be achieved via an onscreen display 12 on the television set 14 connected to the BDR 10, as shown in FIG. 1.

A further feature of the present invention is that the BDR can be used as a land line auto dialler, in that it can share the same memory of telephone numbers and names as that which is stored on the SIM card. The calls can be made from the BDR via the telecommunications line 16.

In one example of use, if a person receives an e-mail via the BDR they may wish to take a record of those details, including the telephone number which appears as part of the e-mail, on their mobile phone. In order to achieve this using the present invention, the SIM card is removed from the mobile phone and placed into the BDR, using the holder as shown in FIG. 2. With the e-mail displayed on screen, the user can highlight the area of the text of the e-mail which includes the phone number and name and, using a transfer facility, cause that information to be copied onto the SIM card so that the same is added to the memory of numbers and names on the SIM card. Control means, typically in the form of a remote control handset can be used to manipulate data on screen of the television. In another use, if a person wishes to dial a number on a land line connected to the BDR, they can place the SIM card into the receiver and select to display the phone book of names and numbers from the SIM card on the screen connected to the receiver. The user can then select, typically using the remote control device, the intended recipient of the call, and the BDR will then dial the selected number. This means that the user then only has to pick up the phone.

Thus it can be seen that the present invention provides a further use of a BDR and allows greater usage of the data contained on the SIM card of a mobile phone.

What is claimed is:

1. A broadcast data receiver, said broadcast data receiver comprising:

means for receiving data from a broadcaster at a remote location;

means for processing and decoding said data to provide video, audio and/or auxiliary data;

means for the reception of a subscriber identity module card from a mobile phone; and means for reading and processing data provided on said subscriber identity module card, thereby allowing said subscriber identity module card data to be stored, viewed and/or utilized via said broadcaster data receiver.

2. A broadcast data receiver according to claim 1 wherein a holder is provided in which said subscriber identity module card may be placed prior to location of the holder and card in said reception means of said broadcast data receiver.

3. A broadcast data receiver according to claim 2 wherein said holder has at least two location positions to allow at least two different sized cards to be located therein.

4. A broadcast data receiver according to claim 1 wherein said means for reading and processing data on said subscriber identity module card is a smart card reader.

5. A broadcast data receiver according to claim 2 wherein said holder of said subscriber identity module card and reception means of said holder and card in said broadcast data receiver may be also used as a smart card holder and smart card reception means.

6. A broadcast data receiver according to claim 4 wherein the memory of said subscriber identity module card is accessed and data stored therein processed by said smart card reader.

7. A broadcast data receiver according to claim 1 wherein a display screen is connected to said broadcast data receiver and data read and processed from said subscriber identity module card is displayed on said display screen.

8. A broadcast data receiver according to claim 7 wherein a user using control means used with the said broadcast data receiver and/or display screen may choose from the group consisting of to select, amend, add and delete the processed data displayed on said display screen.

9. A broadcast data receiver according to claim 4 wherein said smart card reader has a write function.

10. A broadcast data receiver according to 1 wherein said broadcast data receiver is provided with a telecommunications line and data read and processed from said subscriber identity module card may be used to send e-mails and/or make telephone calls via said broadcast data receiver.

11. A broadcast data receiver according to claim 1 wherein data stored in memory means of said subscriber identity module card may be transferred to memory means in said broadcast data receiver and/or vice versa.

12. A method of using a broadcast data receiver, said method including the steps of:

receiving data from a broadcaster at a remote location;

processing and decoding said data to provide video, audio and/or auxiliary data;

inserting a subscriber identity module card from a mobile phone into reception means of a broadcast data receiver;

part or all of data stored in memory means on said subscriber identity module card being read and/or processed by reader means in said broadcast data receiver, thereby allowing said subscriber identity module card data to be stored, viewed and/or utilized via said broadcast data receiver.

13. A broadcast data receiver according to claim 7 wherein said display screen is integrally formed with said broadcast data receiver.

14. A method of using a broadcast data receiver according to claim 12 wherein said subscriber identity module card being inserted directly into said reception means on said broadcast data receiver.

15. A method of using a broadcast data receiver according to claim 12 wherein said subscriber identity module card being inserted indirectly into said reception means on said broadcast data receiver.

* * * * *